US012196385B2

(12) United States Patent
Kim

(10) Patent No.: US 12,196,385 B2
(45) Date of Patent: Jan. 14, 2025

(54) LAMP WITH IMAGE CONVERSION

(71) Applicant: HYUNDAI MOBIS CO., LTD., Seoul (KR)

(72) Inventor: Seok Huyn Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/474,167

(22) Filed: Sep. 25, 2023

(65) Prior Publication Data

US 2024/0102629 A1 Mar. 28, 2024

(30) Foreign Application Priority Data

Sep. 27, 2022 (KR) ........................ 10-2022-0122161
Nov. 16, 2022 (KR) ........................ 10-2022-0153445

(51) Int. Cl.

| | |
|---|---|
| ***F21S 41/675*** | (2018.01) |
| ***F21S 41/32*** | (2018.01) |
| *F21S 41/141* | (2018.01) |
| *F21W 102/30* | (2018.01) |
| *F21Y 115/10* | (2016.01) |

(52) U.S. Cl.

CPC ........... *F21S 41/675* (2018.01); *F21S 41/321* (2018.01); *F21S 41/141* (2018.01); *F21W 2102/30* (2018.01); *F21Y 2115/10* (2016.08)

(58) Field of Classification Search

CPC ...... F21S 41/675; F21S 41/321; F21S 41/141; F21S 41/657

See application file for complete search history.

(56) References Cited

U.S. PATENT DOCUMENTS

| | | | | |
|---|---|---|---|---|
| 10,641,455 B2 * | 5/2020 | Mayer | ...................... | F21S 45/46 |
| 2012/0127747 A1 * | 5/2012 | Ahn | ........................ | F21S 41/25 362/538 |
| 2020/0333182 A1 * | 10/2020 | Ahmed | ................. | G01J 1/4257 |

FOREIGN PATENT DOCUMENTS

| | | | |
|---|---|---|---|
| CN | 101973229 A * | 2/2011 | |
| CN | 104819421 B * | 2/2020 | ........... B60Q 1/0041 |
| KR | 1998-0055846 | 9/1998 | |
| KR | 102440521 | 9/2022 | |

OTHER PUBLICATIONS

Xu et al, CN101973229A, Machine Translation Feb. 2011 (Year: 2011).*
Dubosc et al.CN104819421B, machine translation Feb. 2020 (Year: 2020).*
Chae, KR1998-0055846, machine translation, Sep. 1998 (Year: 1998).*
English Language Abstract of KR 102440521 published Sep. 6, 2022.
English Language Abstract of KR 1998-0055846 published Sep. 25, 1998.

* cited by examiner

*Primary Examiner* — Tracie Y Green
(74) *Attorney, Agent, or Firm* — DLA Piper LLP US

(57) ABSTRACT

A lamp with image conversion. The lamp may differentiate an image of a light emitting diode (LED) lamp from its existing image and easily adjust an amount of light reflected to the outside by including a reflector component that may be rotated by a motor to be deployed and stored, and may fix a position of the reflector after converted to its position desired by a user by including a design for fixing the position of the reflector at both ends of the reflector (that is, an end of the reflector where light is incident and an end of the reflector where light is emitted).

14 Claims, 16 Drawing Sheets

LAMP WITH IMAGE CONVERSION

CROSS-REFERENCE TO RELATED APPLICATIONS

This application claims priority under 35 U.S.C. § 119 to Korean Patent Application No. 10-2022-0122161, filed on Sep. 27, 2022, and Korean Patent Application No. 10-2022-0153445, filed on Nov. 16, 2022, in the Korean Intellectual Property Office, the disclosure of which is incorporated herein by reference in its entirety.

TECHNICAL FIELD

The following disclosure relates to a lamp, and more particularly, to a lamp with image conversion.

BACKGROUND

A conventional vehicle lamp device may include various types of vehicle lamps having a lighting function to easily check an object positioned around a vehicle during night driving and a signaling function to notify another vehicle or a road user of a driving state of the vehicle. In recent years, such a method of providing a signal of the vehicle lamp has had increasing cases of adopting a method of converting an image through a digital signal by using a light emitting diode (LED) drive module rather than an existing blinking method.

In more detail, conventional technology uses a method using an LED optical system and an L/Guide allowing light of the LED optical system to be emitted to a desired position, a method of classifying and arranging small LEDs and independently controlling each LED, or a method of outputting a desired image by one hardware using an organic LED (OLED). This conventional technology may commonly perform image conversion by fixing hardware embedded in the vehicle lamp, which may cause a restriction on an image design that may be converted and visibility problems in some cases.

RELATED ART DOCUMENT

Patent Document (Patent Document 1) Korean Patent Laid-Open Publication No. 10-1998-0055846 "LAMP STRUCTURE FOR A CAR"

SUMMARY

An embodiment of the present disclosure is directed to providing a lamp with image conversion which may differentiate an image of a light emitting diode (LED) lamp from its existing image and easily adjust an amount of light reflected to the outside by including a reflector component that may be rotated by a motor to be deployed and stored.

In more detail, an embodiment of the present disclosure is directed to providing a lamp with image conversion which may fix a position of the reflector after being converted to a position desired by a user by including a design for fixing the position of the reflector at both ends of the reflector (that is, an end of the reflector where light is incident and an end of the reflector where light is emitted).

In one general aspect, a lamp with image conversion includes: a light source; a reflection unit extending around the light source, and reflecting light from the light source; a drive unit connected to a rotation shaft of the reflection unit, fixing or rotating the reflection unit, and causing the light source to perform a linear movement or a rotational movement by including a movement member having one end connected to the light source and extending in one direction; a housing supporting the drive unit and the light source; and a control unit controlling the drive unit, wherein the control unit includes predetermined mode information, and controls the drive unit for the reflection unit to implement a different image based on its mode.

The reflection unit may include a central part connected to the light source, and a first reflection wing extending from the central part.

The first reflection wing may have a first space formed therein, one side open, and the other side shielded, and the reflection unit may further include a second reflection wing accommodated in the first space, and deployed from or accommodated in the first space when the drive unit is operated.

The first reflection wing may include a first step formed in the first space, and the second reflection wing may include a second step formed on its outer surface and engaged with the first step to control a deployment area of the second reflection wing.

The reflection unit may include two or more second reflection wings, at least one of the second reflection wings having a second space formed therein, one side open and the other side shielded, and the other of the second reflection wings being accommodated in the second space.

The second reflection wing may include a third step formed in the second space when having the second space formed therein.

The drive unit may include an actuator controlled by the control unit, and a gear unit rotating the movement member by receiving a rotational force of the actuator.

The movement member may include a rack gear positioned on one end, moved in engagement with the gear unit, and performing the linear movement in an extension direction of the movement member.

The housing may further include a cover part surrounding the other end of the movement member, and the cover part may have one shielded end and the other open end, and is coupled to the movement member by surrounding one end of the movement member.

The housing may further include a first accommodation part accommodating one end of the movement member, and a first connection part having one end coupled with the first accommodation part and the other end coupled with the cover part, and the first connection part may include a fourth step formed in the other end while having a predetermined height to block movement of the cover part.

The drive unit may include an actuator, a driving worm gear connected to and driven by the actuator, a first driven gear driven by being inserted into a shaft connected to the driving worm gear, and a second driven gear moved in engagement with the first driven gear, and moved in one direction, and the second driven gear may have a screw thread positioned in a center, and the movement member has a screw thread positioned on the outside and corresponding to the center of the second driven gear to be inserted into the center of the second driven gear.

The housing may further include a cover rotation part surrounding the other end of the movement member, and the cover rotation part may have one shielded end and the other open end, may be coupled to the movement member by surrounding one end of the movement member, and may have a screw thread positioned on an outer surface of the other end.

The housing may further include a second accommodation part accommodating one end of the movement member, and a second connection part having one end coupled with the second accommodation part and the other end coupled with the cover rotation part, and the second connection part may have a screw thread positioned on an inner surface of the other end and corresponding to the outer surface of the other end of the cover rotation part.

The movement member may have a fifth step protruding from the other end while having a predetermined height.

The reflection unit may have a communication hole which is formed in a center and into which the movement member is inserted, and may be bent at a predetermined curvature to have the concave center.

The control unit may derive a target position of the light source based on a predetermined requested view range and a predetermined requested light intensity value.

The control unit may move the movement member to one side by supplying power to an actuator of the drive unit when the requested view range has a predetermined reference value or more.

The control unit may deploy at least one second reflection wing included in the reflection unit by rotating the rotation shaft in one direction, and move the movement member to one side by supplying power to an actuator of the drive unit when the requested light intensity value is a predetermined reference value or more, and may accommodate the at least one second reflection wing included in the reflection unit by rotating the rotation shaft in the other direction when the requested light intensity value is less than the predetermined reference value.

DETAILED DESCRIPTION OF EMBODIMENTS

Hereinafter, the spirit of the present disclosure is described in detail with reference to the accompanying drawings. Terms and words used in the specification and claims are not to be construed as general or dictionary meanings, and are to be construed as meanings and concepts meeting the spirit of the present disclosure based on a principle that the inventors may appropriately define the concepts of terms in order to describe their inventions in best mode.

Figure 2:
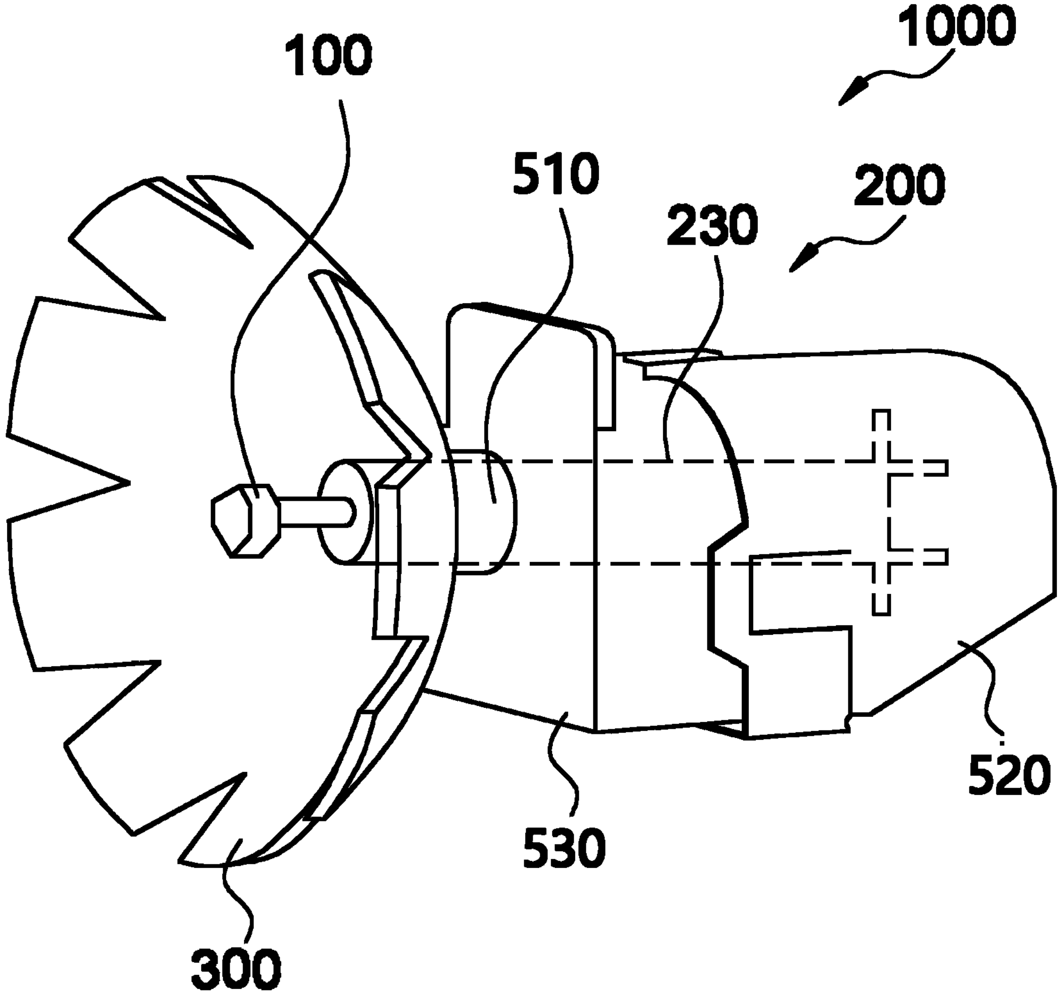
FIG. 2 is a perspective view of the lamp with image conversion of the present disclosure.
Figure 3:
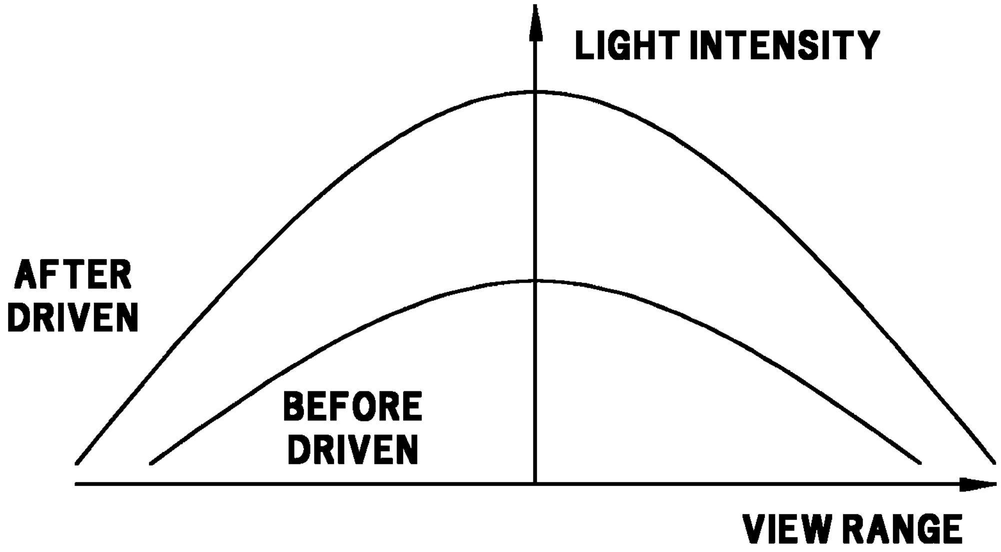
FIG. 3 is a graph showing changes in light intensity and view range based on whether a reflection unit of the lamp with image conversion of the present disclosure is rotated.

Hereinafter, the description describes a basic configuration of a lamp 1000 with image conversion of the present disclosure with reference to FIGS. 1 to 3.

Figure 1:
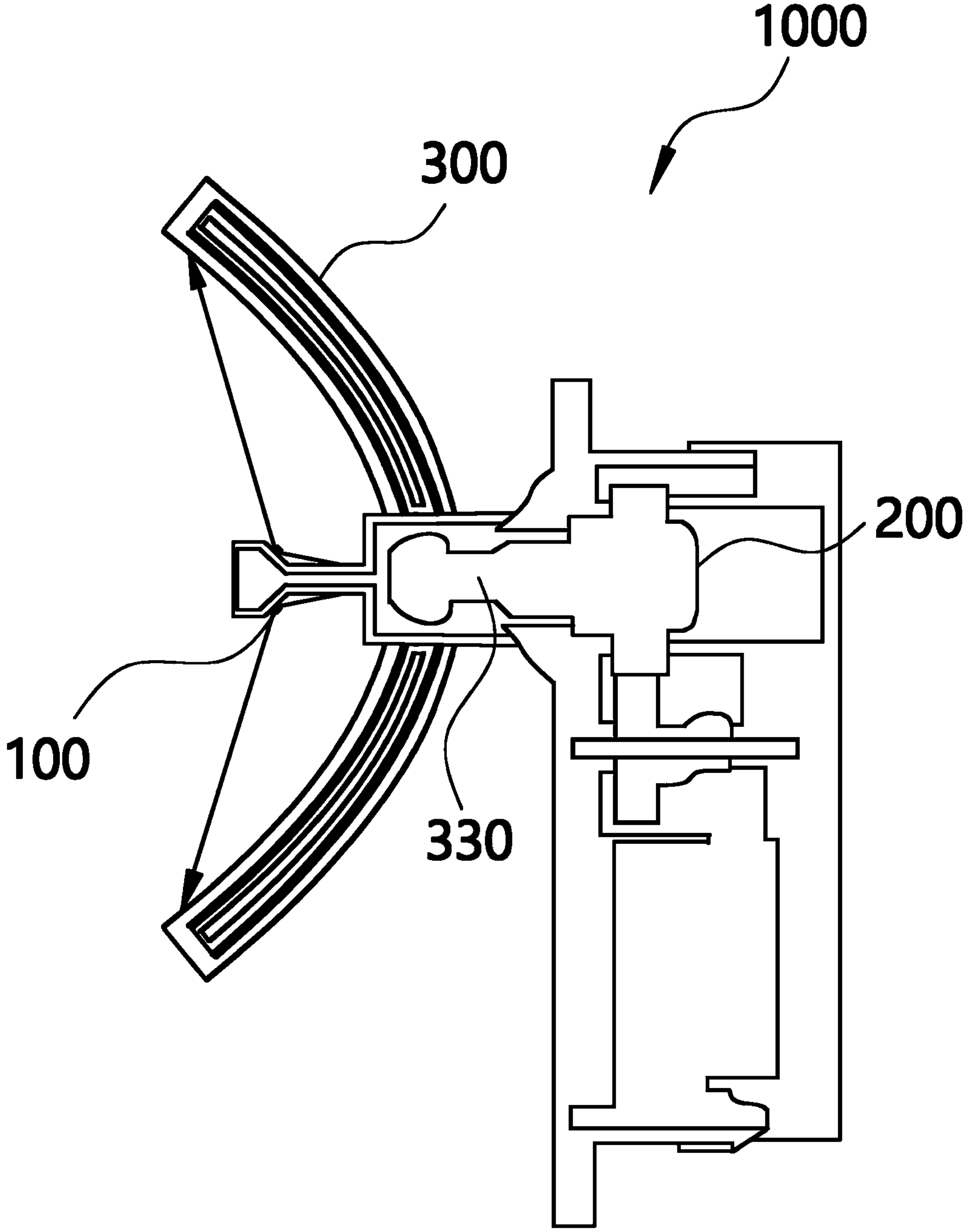
FIG. 1 is a cross-sectional view of a lamp with image conversion of the present disclosure.

As shown in FIG. 1, the lamp 1000 with image conversion of the present disclosure may include a light source 100 emitting light, and a reflection unit 300 extending around the light source 100 and reflecting light from the light source 100. Here, the light source 100 may be an LED module. In addition, the lamp 1000 with image conversion of the present disclosure may include a drive unit 200 connected to the reflection unit 300 and rotating the reflection unit 300. A movement member 230 may be inserted into the center of the reflection unit 300, and the drive unit 200 may rotate the reflection unit 300 by transmitting torque to the movement member 230. In addition, as shown in FIG. 2, the drive unit 200 may include the movement member 230 having one end connected to the light source 100 and extending in one direction. The movement member 230 may cause the light source 100 to perform a linear movement or a rotational movement. The drive unit 200 may include an actuator 210 to provide power to the movement member 230.

In addition, the lamp 1000 with image conversion of the present disclosure may include a control unit 400, and the control unit 400 may control the drive unit 200 for the reflection unit 300 to implement a different image based on mode information of the control unit 400. The description below describes image conversion of the reflection unit 300 in detail.

In addition, the lamp 1000 with image conversion of the present disclosure may include a housing 500 supporting the drive unit 200 and the light source 100. The housing 500 may accommodate the components of the drive unit 200. In addition, the lamp 1000 with image conversion of the present disclosure may include the reflection unit 300. The reflection unit 300 may extend around the light source 100 to reflect light of the light source 100, and be bent at a predetermined curvature to have a concave center.

In addition, the reflection unit 300 may have a communication hole formed in the center, and the movement member 230 and some components (such as the cover part 510 or cover rotation part 540) of the housing 500 that is connected to the movement member 230 may be inserted into the communication hole. Here, a position of the reflection unit 300 may be fixed regardless of a change in a position of the movement member 230. Accordingly, a phase between the light source 100 connected to the movement member and the reflection unit 300 is changed, thus adjusting the light intensity and view range of the light emitted to the outside through the reflection unit 300.

By adopting this configuration, the lamp 1000 with image conversion of the present disclosure may perform the image conversion by, for example, rotating the reflection unit 300 reflecting light. In addition, as shown in FIG. 3, the lamp 1000 may spread light in a wider range, increase central light intensity without increasing power supplied to the light source 100, and give an animation effect to light. Accordingly, the lamp 1000 may have a higher degree of design freedom and higher visibility compared to an existing vehicle lamp method.

Hereinafter, the description describes the reflection unit 300 of the present disclosure in more detail with reference to FIGS. 4 to 6.

Figure 4:
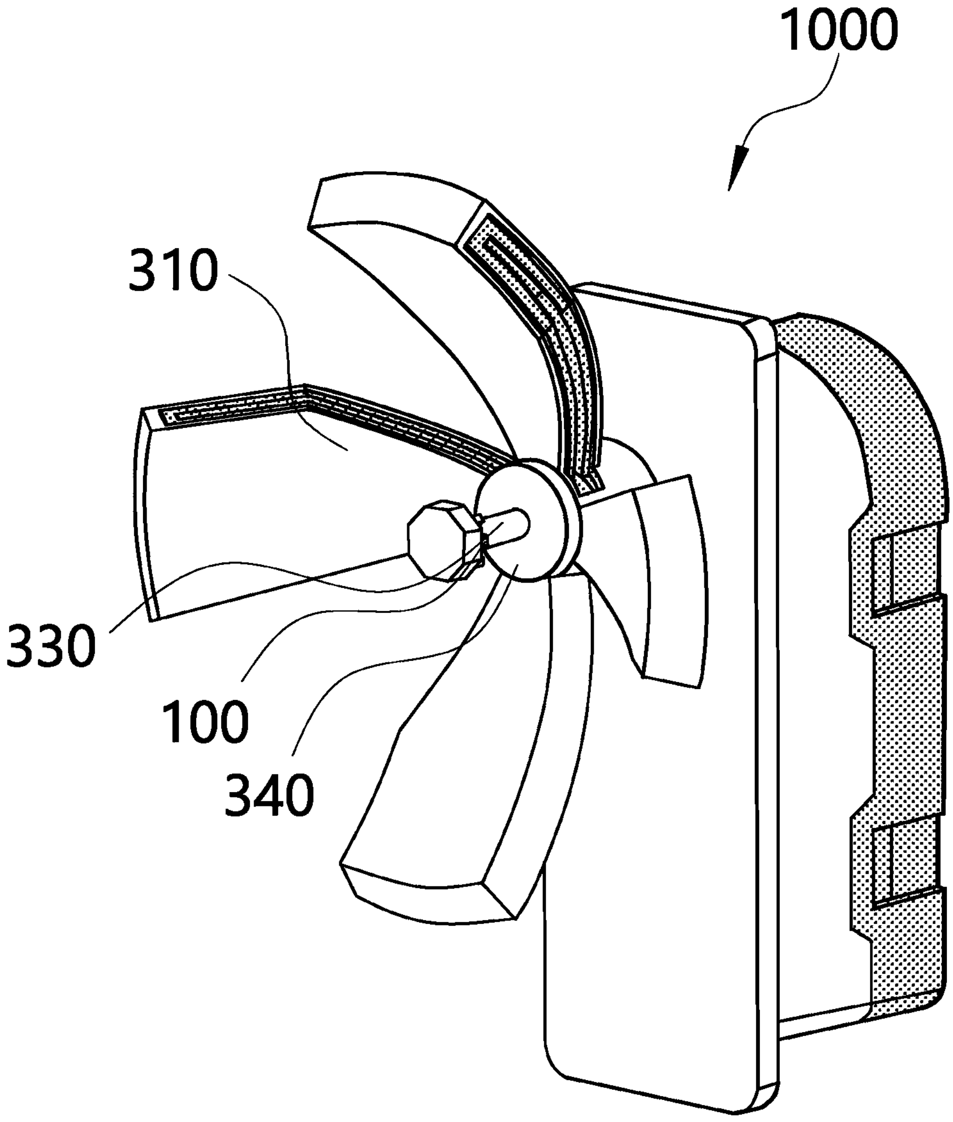
FIG. 4 is a perspective view showing a first reflection wing of the lamp with image conversion of the present disclosure.

As shown in FIG. 4, the reflection unit 300 may include a central part 340 connected to the light source 100. The central part 340 may be inserted into the movement member 230 described above, and may receive torque from the drive unit 200 and be rotated together with the movement member 230. In addition, the reflection unit 300 may include a first reflection wing 310 extending from the central part 340. The first reflection wing 310 may be integrally formed with the central part 340 and rotated together with the central part 340. In addition, the reflection unit 300 may include two or more first reflection wings 310, and the first reflection wings 310 may respectively be spaced apart from each other by a certain angle.

Figure 5:
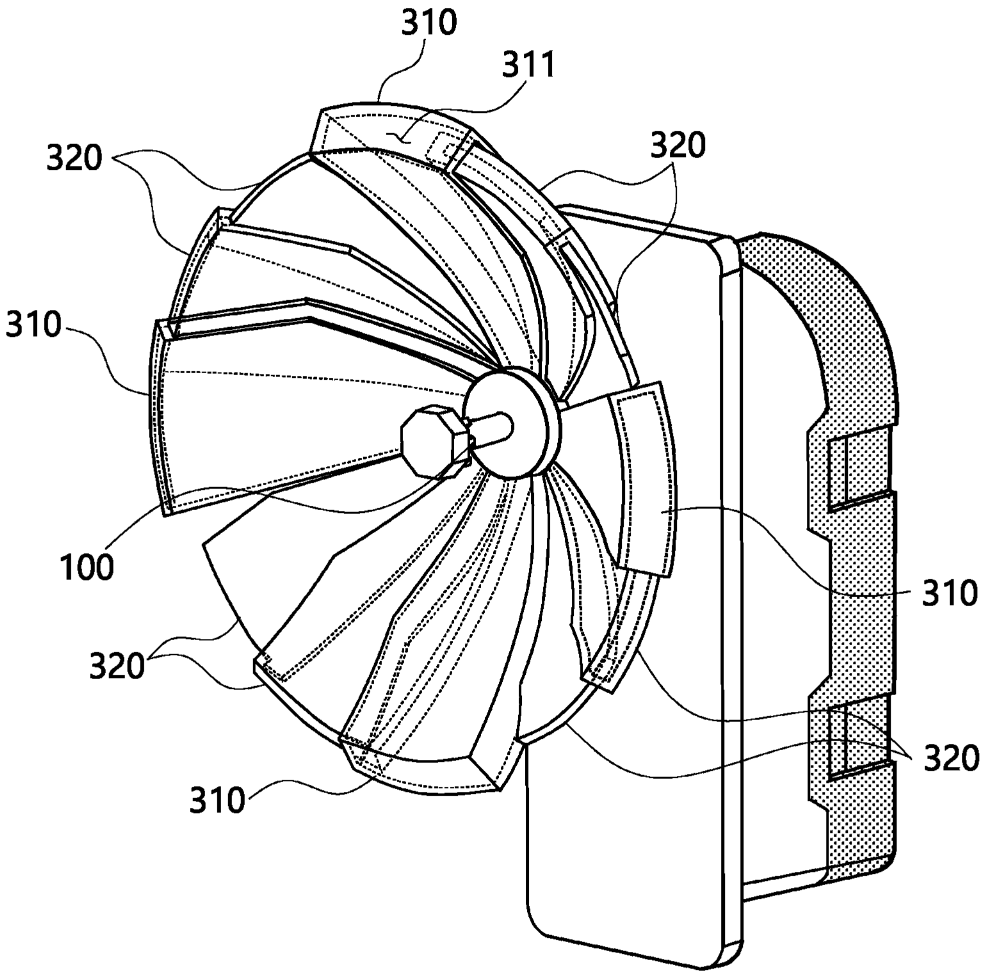
FIG. 5 is a perspective view showing a second reflection wing of the lamp with image conversion of the present disclosure.

In addition, as shown in FIG. 5, the first reflection wing 310 may have a first space 311 formed therein, one side open, and the other side shielded. In addition, the reflection unit 300 may include a second reflection wing 320 accommodated in the first space 311. The second reflection wing 320 may be deployed from or accommodated in the first space when the drive unit 200 is operated. In more detail, the second reflection wing 320 may be deployed when the movement member 230 is rotated toward the open side of the first reflection wing 310, and accommodated when the movement member 230 is rotated toward the other side shielded of the first reflection wing 310. The second reflection wing 320 may be deployed by a centrifugal force generated as the movement member 230 is rotated.

Each of the first reflection wing 310 and the second reflection wing 320 may have a fan-shaped reflecting surface on which light is reflected from the light source 100, and at least one of the corners of its end opposite to its end connected to the central part 340 and trimmed to a predetermined depth. Accordingly, each of the first reflection wing 310 or the second reflection wing 320 may have a pinwheel shape, and receive minimal wind resistance occurring when the drive unit 200 rotates the reflection unit 300. In addition, even when the second reflection wing 320 is fully deployed, a gap may be formed between the second reflection wing 320 and the first reflection wing 310 adjacent to the second reflection wing 320, thereby minimizing the wind resistance occurring when the reflection unit 300 is rotated.

Furthermore, the reflection unit 300 may include two or more second reflection wings 320, and at least one of the second reflection wings 320 may have a second space 321 formed therein. Here, the second reflection wing 320 may have one side open and the other side shielded. The other of the second reflection wings 320 may be accommodated in the second space 321. That is, the other second reflection wing 320 may be accommodated in the second reflection wing 320. Three or more second reflection wings 320 may be accommodated in the first reflection wings 310 of the reflection unit 300 in addition to the embodiment in which two second reflection wings 320 are respectively accommodated in the first reflection wings 310 shown in FIG. 5.

Figure 6:
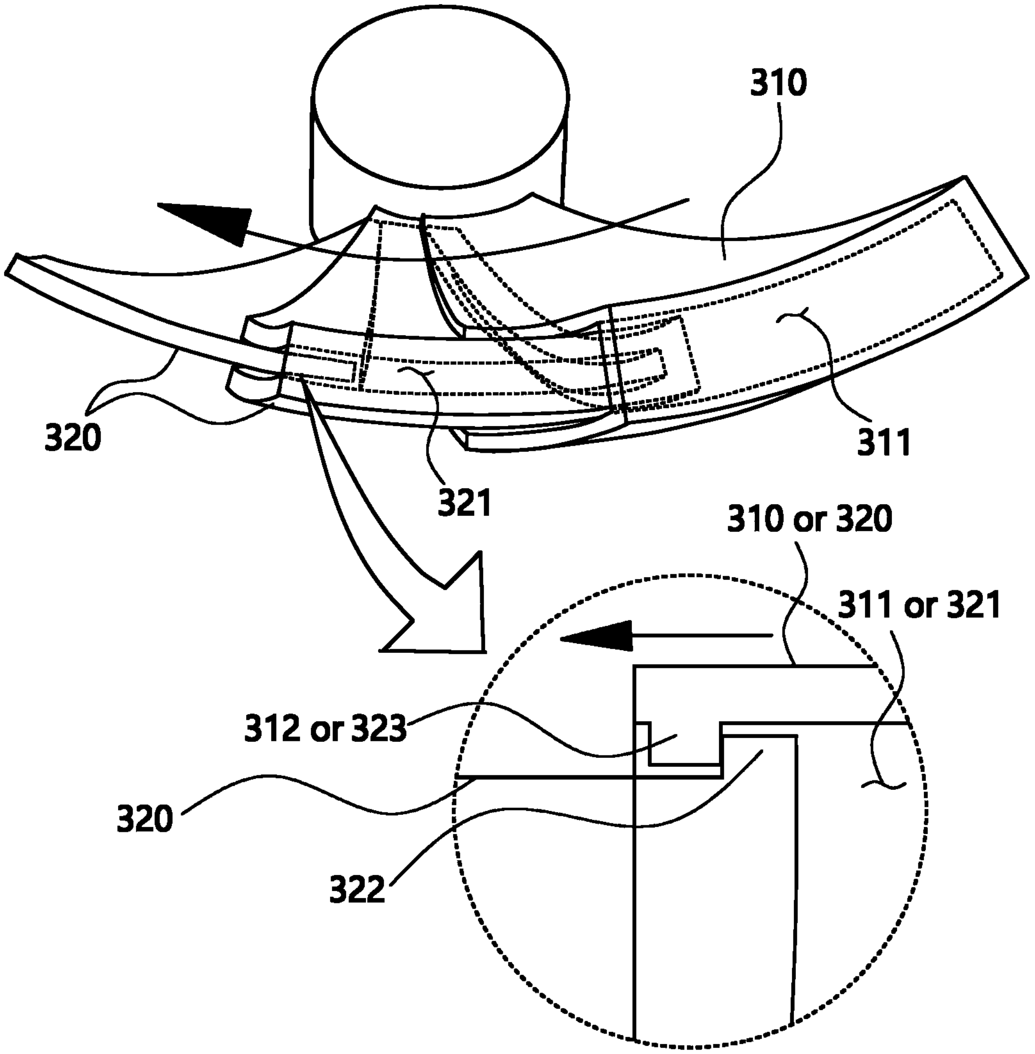
FIG. 6 is a partial perspective view showing a coupling relationship between the first reflection wing and the second reflection wing of the present disclosure.

In addition, as shown in FIG. 6, the first reflection wing 310 may include a first step 312 formed in the first space 311, and the second reflection wing 320 may include a second step 322 formed on its outer surface. The second reflection wing 320 may include the second step 322 engaged with the first step 312 to control a deployment area of the second reflection wing 320. In addition, the second reflection wing 320 may include a third step 323 formed in the second space 321 when having the second space 321 formed therein.

Furthermore, the first step 312 and the third step 323 may respectively protrude from at least one of all inner surfaces of the first space 311 and that of the second space 321 in addition to the embodiment in which the first step 312 and the third step 323 are respectively formed at a distal end (or the end opposite to the end connected to the central part 340) of the first space 311 and that of the second space 321 shown in FIG. 6. The second step 322 may be formed on the outer surface of the second reflection wing 320 and formed in a position where the second step 322 is engaged with the first step 312 or the third step 323.

In this way, the first step 312 or the third step 323 may be engaged with the second step 322, thereby limiting a region where the second reflection wing 320 is deployed, and maintaining the first reflection wing 310 and the second reflection wing 320 or the second reflection wing 320 and the second reflection wing 320 to be fully deployed without being separated from each other when the drive unit 200 rotates the reflection unit 300 at a high speed.

Hereinafter, the description describes a coupling relationship between the drive unit 200 and housing 500, and describes the lamp 1000 with image conversion in each implementation example of the present disclosure based on this relationship in more detail with reference to FIG. 7.

Figure 7:
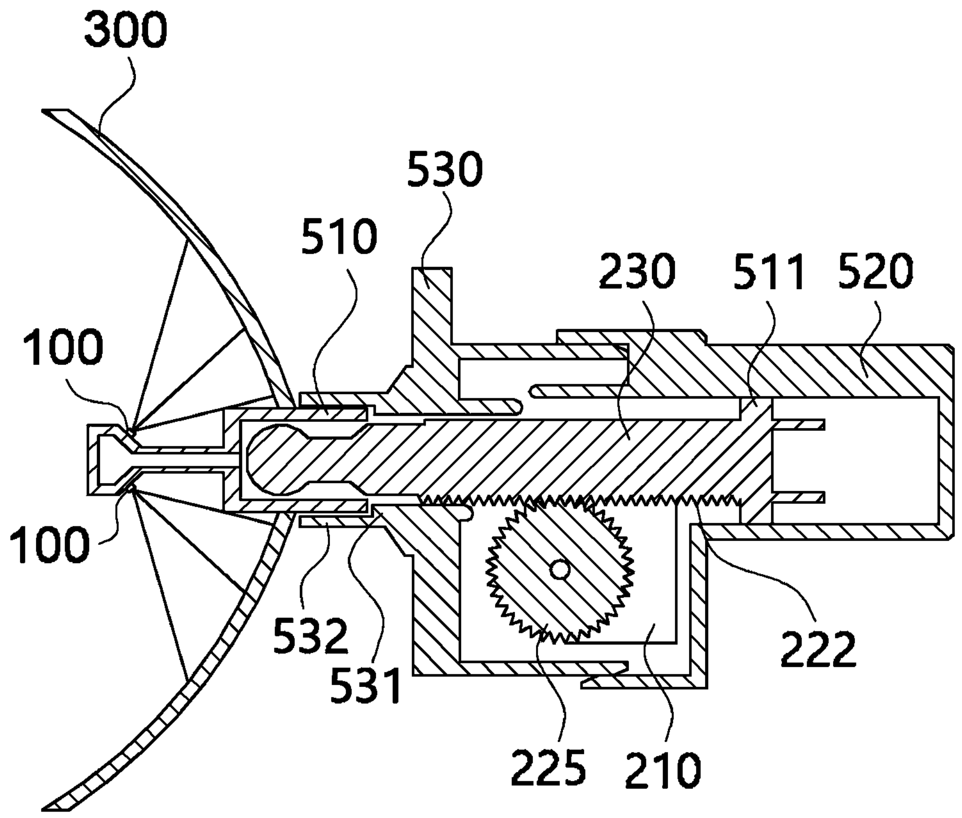
FIG. 7 is a cross-sectional view of a lamp with image conversion in a first implementation example of the present disclosure.

As shown in FIG. 7, the drive unit 200 may include the actuator 210 controlled by the control unit 400, and a gear unit 220 rotating and moving the reflection unit 300 and movement member 230 back and forth by receiving a rotational force of the actuator 210. In addition, in the lamp 1000 with image conversion in the first implementation example of the present disclosure, the movement member 230 may perform only the linear movement to provide a kinetic change between the reflection unit 300 and the light source 100, thereby changing the view range and light intensity of light emitted to the outside. Accordingly, the housing 500 may have a shape elongated to the rear of the reflection unit 300 in a movement direction of the movement member 230.

In more detail, as shown in FIG. 7, the drive unit 200 may include a driving gear 225 rotated by being inserted into a rotation shaft of the actuator 210, and the movement member 230 may include a rack gear 222 positioned on one end, moved in engagement with the driving gear 225, and performing the linear movement in an extension direction of the movement member 230. In more detail, the movement member 230 may have the rack gear 222 integrally formed on its side surface, that is, its side surface where the movement member 230 engages with the driving gear 225. A side surface of the movement member 230 where the rack gear 222 is not formed may be flat. As such, the movement member 230 may include the driving gear 225 and the rack gear 222 to be driven in a straight line by a rotation of the actuator 210.

In addition, in the lamp 1000 with image conversion in the first implementation example of the present disclosure, the housing 500 may include the cover part 510 surrounding the other end of the movement member 230, a first accommodation part 520 accommodating one end of the movement member 230, and a first connection part 530 inserted and connected between the first accommodation part 520 and the cover part 510. In more detail, the cover part 510 may have one shielded end and the other open end, may be coupled to the movement member 230 by surrounding one end of the movement member 230, may be inserted into the communication hole of the reflection unit 300 to be moved in conjunction with the movement member 230, and may provide the kinetic change between the light source 100 and the reflection unit 300. The cover part 510 may further include a rigid bar positioned on its one shielded end and connected to the light source 100. In addition, the first connection part 530 may have one end coupled with the first accommodation part 520 and the other end coupled with the cover part 510.

In more detail, the first connection part 530 may include a first concave part 532 extending in a shape corresponding to that of the cover part 510 for the cover part 510 to be inserted into the other end, and the first concave part 532 may include a fourth step 531 formed therein while having a predetermined height to block movement of the cover part 510. Accordingly, the cover part 510 may be inserted into the concave part, and may only be inserted up to its position limited to that of the fourth step 531. In addition, the first concave part 532 may have an end connected to the reflection unit 300 to thus fix the position of the reflection unit 300.

Here, the movement member 230 may have a fifth step 511 protruding from the other end while having a predetermined height. Accordingly, the first connection part 530 and the fifth step 511 may be stuck together when the movement member 230 is excessively moved in one direction, thus limiting a movement range of the movement member 230.

Figure 8:
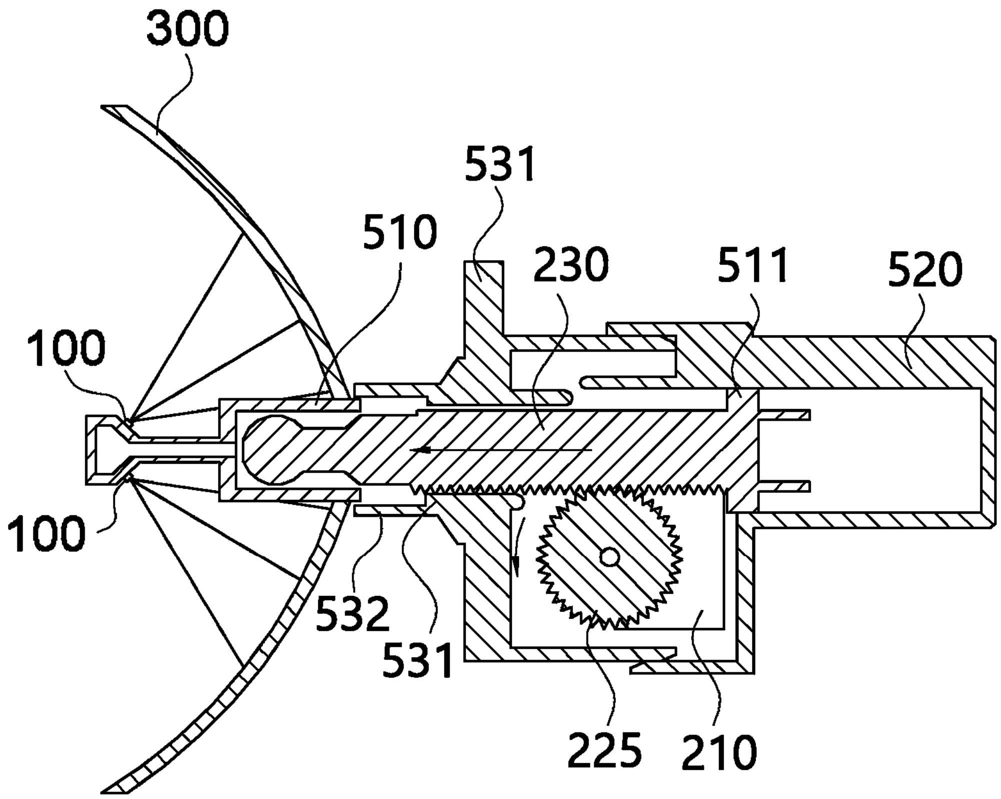
FIGS. 8 and 9 are cross-sectional views showing an operation of the lamp with image conversion in the first implementation example of the present disclosure.
Figure 9:
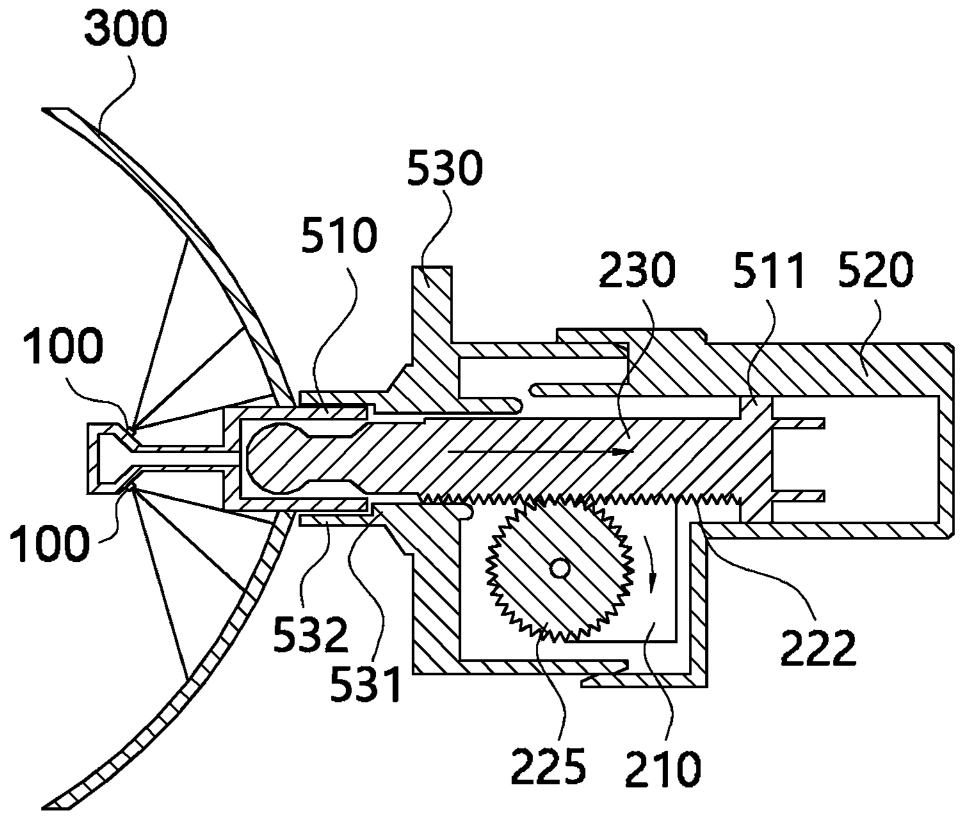

As shown in FIG. 8, in the lamp 1000 with image conversion in the first implementation example of the present disclosure, the drive unit 200 may move the movement member 230 in one direction, that is, in a direction in which the movement member 230 and the cover part 510 are coupled with each other. Accordingly, the light source 100 may be further away from the center of the reflection unit 300, thus expanding the view range. In addition, as shown in FIG. 9, the drive unit 200 may move the movement member 230 in the other direction. Accordingly, the light source 100 may be closer to the center of the reflection unit 300, thus reducing the view range while increasing central light intensity.

When adopting the lamp 1000 with image conversion in the first implementation example of the present disclosure, it is possible to allow the light source 100 to be moved in a straight direction while minimizing the configuration of the drive unit 200, and provide an animation effect of light emitted to the outside at a minimum cost.

Figure 10:
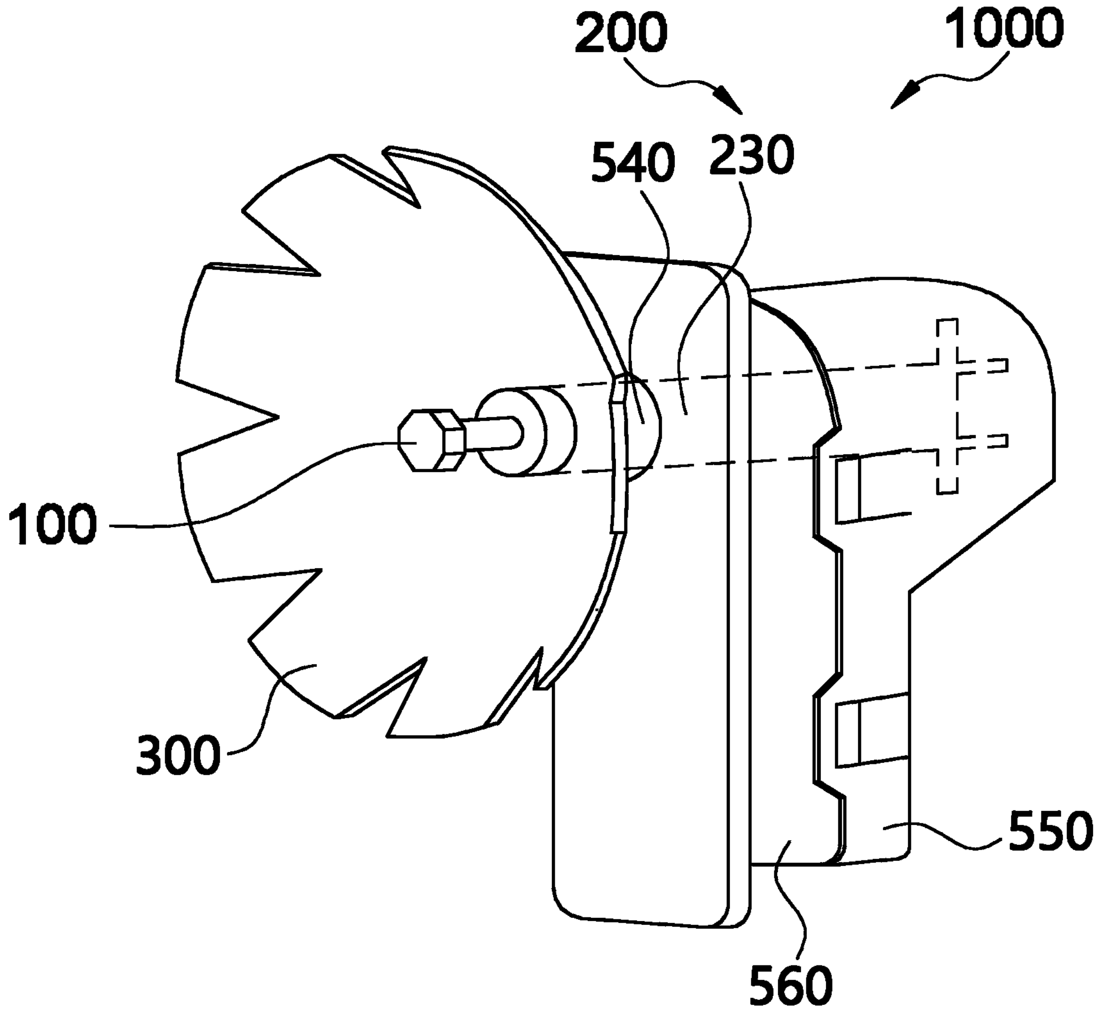
FIG. 10 is a perspective view of a lamp with image conversion in a second implementation example of the present disclosure.

As shown in FIG. 10, in the lamp 1000 with image conversion in a second implementation example of the present disclosure, the movement member 230 may perform both the linear movement and the rotational movement to provide the kinetic change between the reflection unit 300 and light source 100, thereby changing the view range and light intensity of light emitted to the outside, and increase the light intensity of light emitted to the outside while maintaining an amount of light of the light source 100. In the lamp 1000 with image conversion in the second implementation example of the present disclosure, the housing 500 may extend to the rear of the reflection unit 300 in the movement direction of the movement member 230, and extend in a vertical direction to accommodate the configuration of the drive unit 200 for the rotations of the actuator 210 and the movement member 230.

Figure 11:
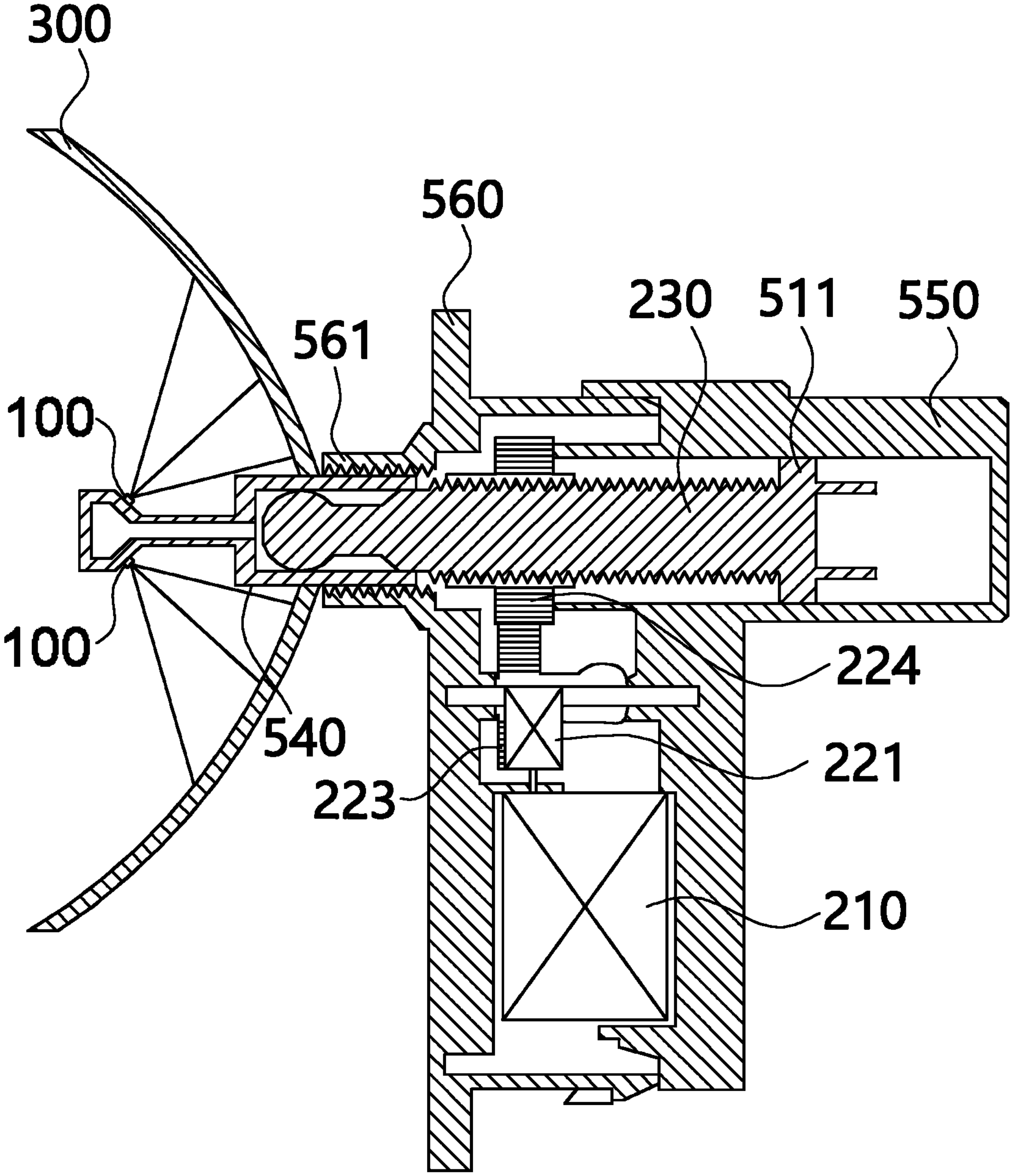
FIG. 11 is a cross-sectional view of the lamp with image conversion in the second implementation example of the present disclosure.

In more detail, as shown in FIG. 11, the drive unit 200 may include the actuator 210, a driving worm gear 221 connected to and driven by the actuator 210, and a first driven gear 223 driven by being inserted into a shaft connected to the driving worm gear 221. The first driven gear 223 may be a spur gear or a helical gear. Here, in more detail, as shown in FIG. 11, each rotation shaft of the driving worm gear 221 and the first driven gear 223 may be disposed to be perpendicular to each other, and the driving worm gear 221 and the first driven gear 223 may be engaged with each other to be rotated to thus transmit torque of the worm gear 221 to the first driven gear 223.

In addition, the drive unit 200 may include a second driven gear 224 moved in engagement with the first driven gear 223, and moved in one direction. The second driven gear 224 may be inserted into the movement member 230 by its rotation shaft passing through the movement member 230, and further have a screw thread positioned in the center. The movement member 230 may have a screw thread positioned on the outside and corresponding to the center of the second driven gear 224. Accordingly, the movement member 230 may be rotated simultaneously when the second driven gear 224 is rotated and may perform the linear movement in the extension direction. A position of the second driven gear 224 may be fixed to the housing 500 or the like.

In addition, as shown in FIG. 11, in the lamp 1000 with image conversion in the second implementation example of the present disclosure, the housing 500 may include the cover rotation part 540 surrounding the other end of the movement member 230, a second accommodation part 550 accommodating one end of the movement member 230, and a second connection part 560 inserted and connected between the second accommodation part 550 and the cover rotation part 540. In more detail, the cover rotation part 540 may have one shielded end and the other open end, may be coupled to the movement member 230 by surrounding one end of the movement member 230, may be inserted into the communication hole of the reflection unit 300 to be moved in conjunction with the movement member 230, and may provide the kinetic change between the light source 100 and the reflection unit 300. The cover rotation part 540 may further include a rigid bar positioned on its one shielded end and connected to the light source 100. In addition, the second connection part 560 may have one end coupled with the second accommodation part 550 and the other end coupled with the cover rotation part 540.

In more detail, the second connection part 560 may include a second concave part 561 extending in a shape corresponding to that of the cover rotation part 540 for the cover rotation part 540 to be inserted into the other end. The cover rotation part 540 may have a screw thread positioned on an outer surface of the other end, and the second connection part 560 may have a screw thread positioned on an inner surface of the other end and corresponding to the outer surface of the other end of the cover rotation part 540. Accordingly, the cover rotation part 540 may perform the linear and rotational movements together with the movement member 230 while the cover rotation part 540 and the second connection part 560 support each other's positions.

Here, the movement member 230 may have the fifth step 511 protruding from the other end while having a predetermined height. Accordingly, the movement member 230 may be caught by the second connection part 560 and the fifth step 511 when excessively moved in one direction, and thus have a limited movement range.

Figure 12:
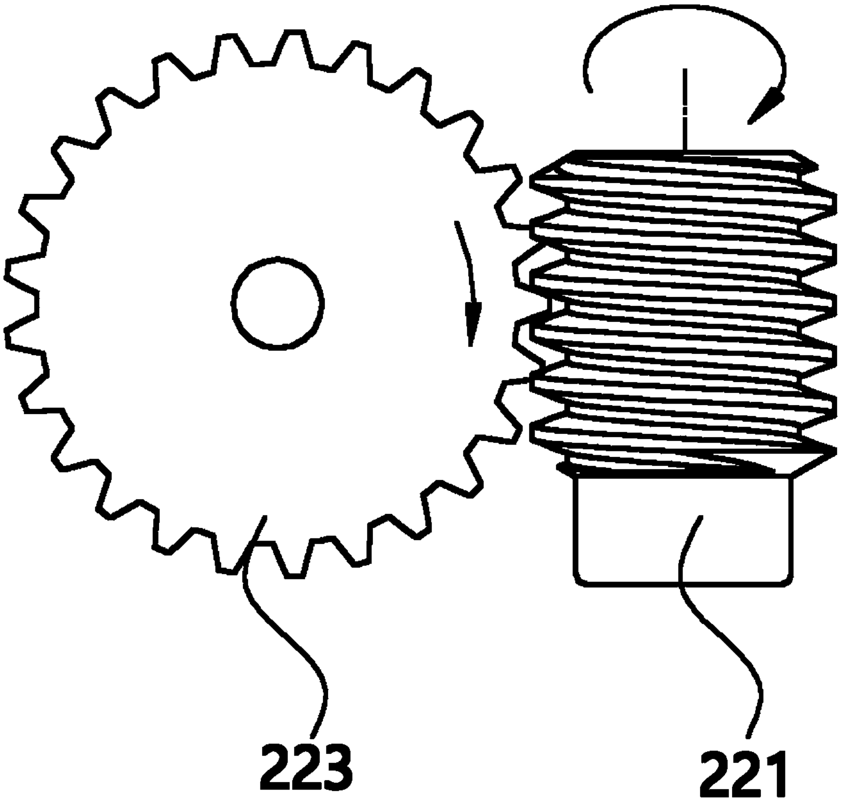
FIG. 12 is a schematic view showing a coupling relationship between the driving worm gear and second driven gear of the present disclosure.

As shown in FIG. 12, in the lamp 1000 with image conversion in the second implementation example of the present disclosure, the drive unit 200 may cause the movement member 230 to perform the linear movement in one direction, that is, in the direction in which the movement member 230 and the cover part 510 are coupled with each other. Here, the movement member 230 may be rotated simultaneously. Accordingly, the light source 100 may be further away from the center of the reflection unit 300, thus expanding the view range while maintaining the light intensity. The movement member 230 may then be rotated continuously even when the linear movement of the movement member 230 is blocked as the fifth step 511 of the movement member 230 and the second connection part 560 are stuck together.

Figure 13:
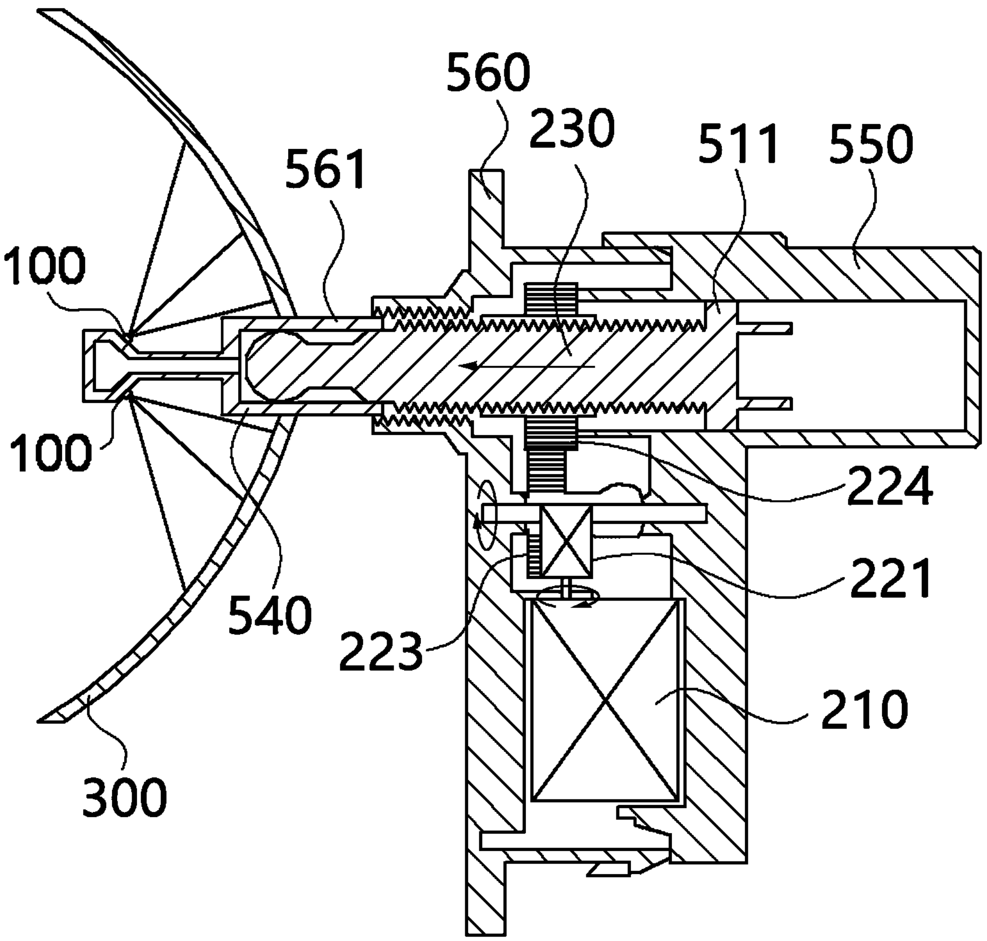
FIGS. 13 and 14 are cross-sectional views showing an operation of the lamp with image conversion in the second implementation example of the present disclosure.

In addition, as shown in FIG. 13, the drive unit 200 may move the movement member 230 in the other direction. Here, the movement member 230 may be rotated simultaneously. Accordingly, the light source 100 may be closer to the center of the reflection unit 300, thus reducing the view range while increasing the central light intensity. The movement member 230 may then be rotated continuously even when the linear movement of the movement member 230 is blocked as the cover rotation part 540 and the fourth step 531 of the second connection part 560 are stuck together.

Figure 14:
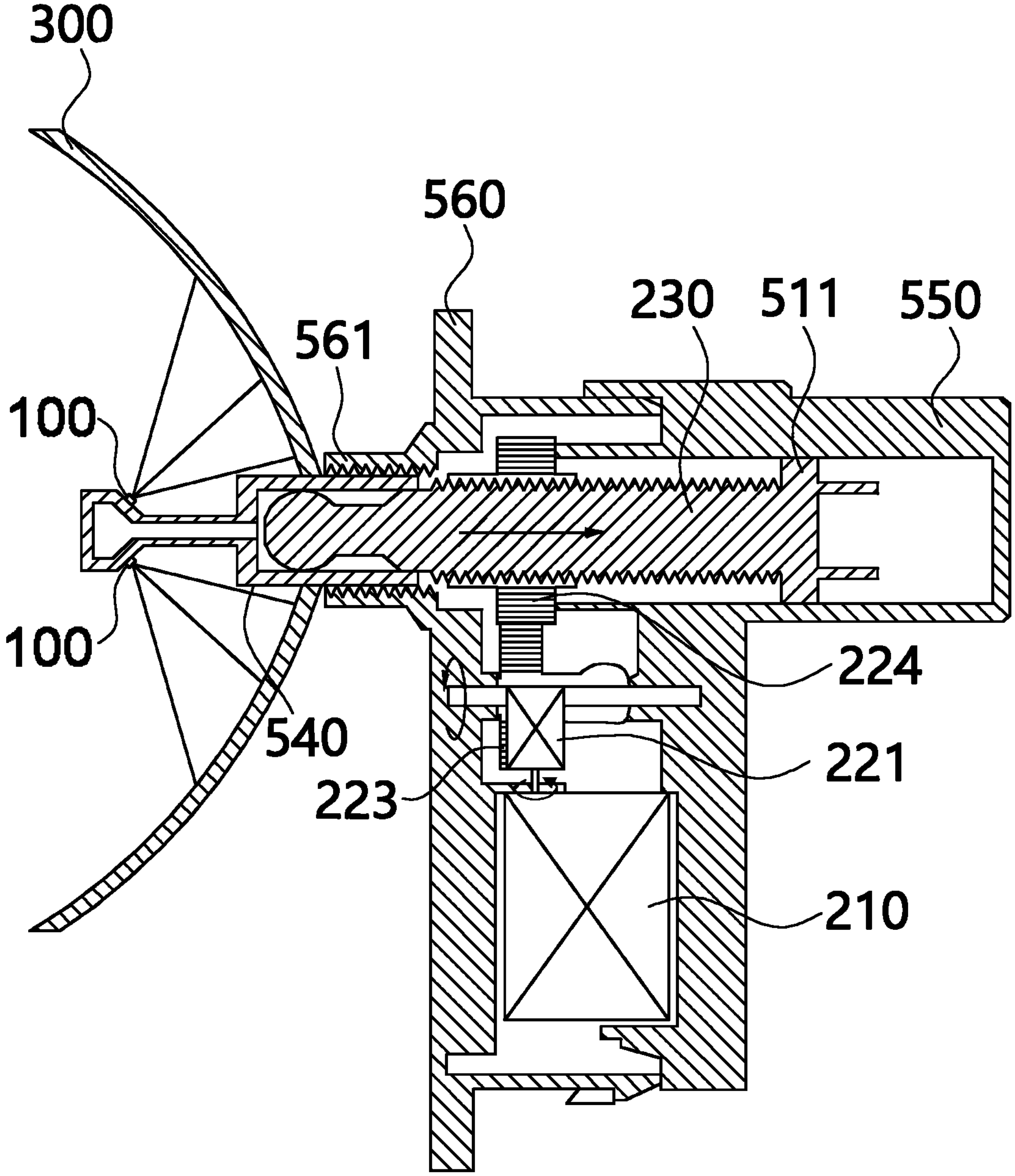
Figure 15:
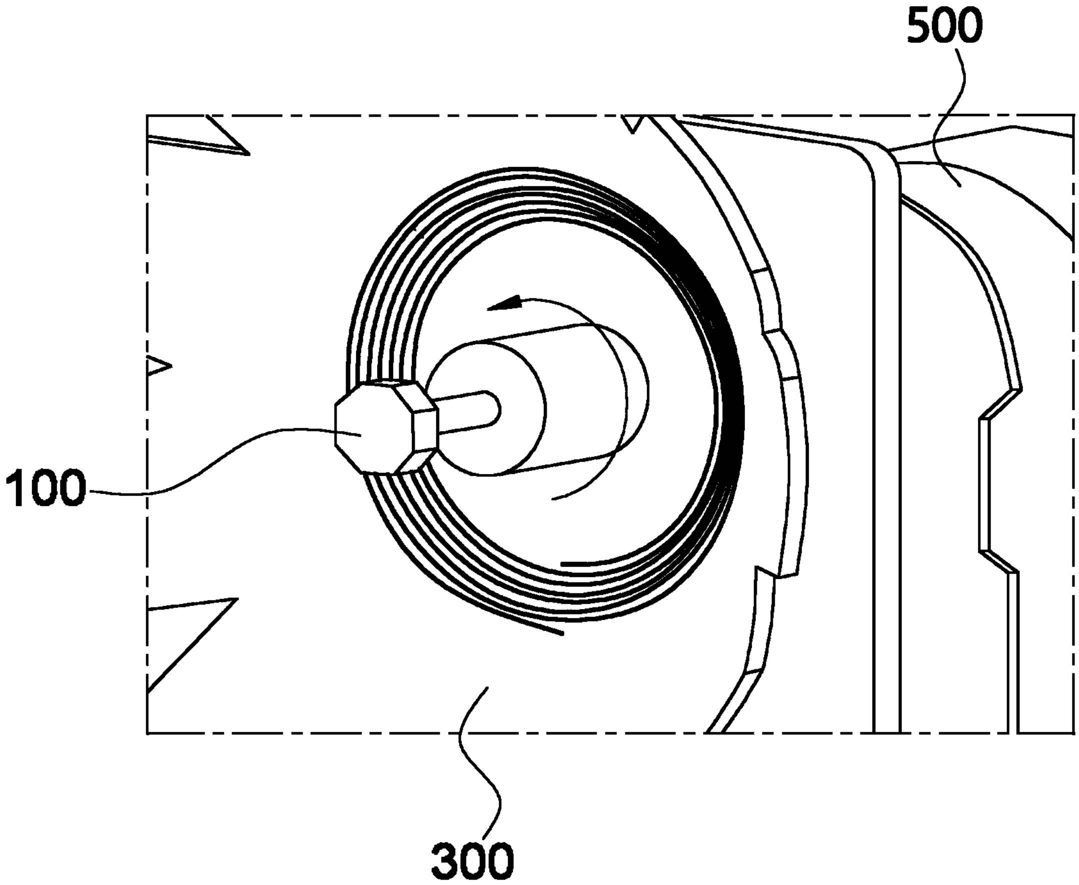
FIG. 15 is a schematic view showing an afterimage effect when a light source of the lamp with image conversion in the present disclosure is rotated.

As the movement member 230 connected to the light source 100 performs not only the linear movement but also the rotational movement in this way, light from the light source 100 may be emitted while leaving a certain afterimage on the reflection unit 300 as shown in FIG. 14. Accordingly, as shown in FIG. 15, the light intensity and view range of light emitted to the outside may be higher and wider than when the movement member 230 is not rotated (or before being driven as shown in FIG. 9) in a state where the light source 100 has the same amount of light.

Hereinafter, the description describes the control unit 400 of the present disclosure in more detail with reference to FIG. 16.

Figure 16:
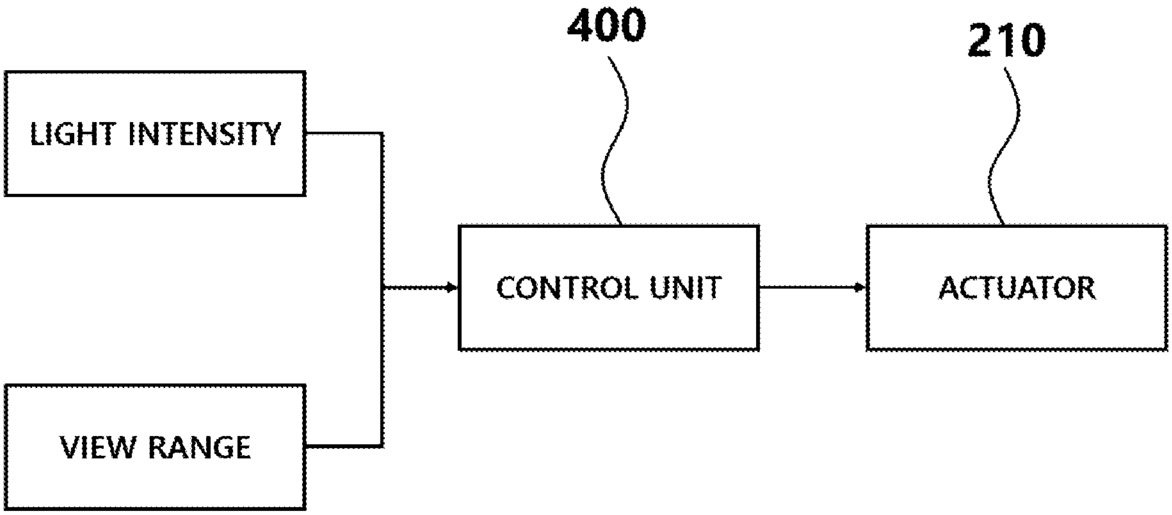
FIG. 16 is a block diagram showing a coupling relationship between the control unit and another component of the present disclosure.

As shown in FIG. 16, the lamp 1000 with image conversion of the present disclosure may further include the control unit 400 controlling the drive unit 200. The control unit 400 may receive or calculate a requested light intensity value from the outside. The control unit 400 may increase requested light intensity when illuminance near transportation means using the lamp 1000 with image conversion of the present disclosure has a predetermined reference value or more. In addition, the lamp 1000 with image conversion of the present disclosure may reduce the requested light intensity as a movement speed of the transportation means is reduced, and receive nearby weather information and increase the requested light intensity in case of rain or fog to enable a vehicle occupant to secure his/her view.

The control unit 400 may then compare the received requested light intensity value with the pre-stored reference value, and deploy at least one of the second reflection wings 320 by rotating the rotation shaft 330 in one direction by using the actuator 210 when the requested light intensity has the predetermined reference value or more. The second reflection wing 320 may be deployed and the reflection unit 300 may be rotated to thus allow light to be rotated more widely and more light to be reflected from the light source 100 to the outside, thereby increasing the central light intensity. In addition, the control unit 400 may accommodate at least one of the second reflection wings 320 by rotating the actuator 210 in the other direction, thereby reducing the light intensity when the received requested light intensity value is less than the predetermined reference value.

In addition, the control unit 400 may move the movement member 230 to one side by supplying power to the actuator 210 when a requested view range has a predetermined reference value or more. As shown in FIG. 16, the control unit 400 may move the movement member 230 to one side by supplying power to the actuator 210 when the requested light intensity value is the predetermined reference value or more. In addition, the requested light intensity value may be higher than a light intensity value which may be secured by the kinetic change. In this case, it is possible to increase the amount of light of the light source 100 by the control unit 400 when using the lamp 1000 with image conversion in the first implementation example of the present disclosure, and it is possible to rotate the movement member 230 when using the lamp 1000 with image conversion in the second implementation example of the present disclosure.

The spirit of the present disclosure should not be limited to the embodiments described above. The present disclosure may be applied to various fields, and may be variously modified by those skilled in the art without departing from the scope of the present disclosure claimed in the claims. Therefore, it is obvious to those skilled in the art that these alterations and modifications fall within the scope of the present disclosure.

What is claimed is:

1. A lamp with image conversion comprising:

a light source;

a reflection unit extending around the light source and configured to reflect light from the light source;

a drive unit connected to a rotation shaft of the reflection unit and being configured to fix or rotate the reflection unit and cause the light source to perform a linear movement or a rotational movement by including a movement member having one end connected to the light source and extending in one direction;

a housing configured to support the drive unit and the light source; and a control unit configured to control the drive unit, wherein the control unit comprises predetermined mode information, and is configured to control the drive unit such that the reflection unit implements a different image based on its mode;

wherein the reflection unit comprises a central part connected to the light source, and a first reflection wing extending from the central part;

wherein the first reflection wing comprises a first space formed therein, one side open, and one shielded side and the reflection unit further comprises a second reflection wing accommodated in the first space, and configured to be deployed from or accommodated in the first space when the drive unit is operated;

wherein the control unit is configured to derive a target position of the light source based on a predetermined requested view range and a predetermined requested light intensity value;

wherein the control unit is configured to:

deploy at least one second reflection wing included in the reflection unit by rotating the rotation shaft in one direction, move the movement member to one side by supplying power to an actuator of the drive unit when the requested light intensity value is a predetermined reference value or more, and accommodate the at least one second reflection wing included in the reflection unit by rotating the rotation shaft in the another direction when the requested light intensity value is less than the predetermined reference value.

2. The lamp of claim 1, wherein:

the first reflection wing comprises a first step formed in the first space, and the second reflection wing comprises a second step formed on its outer surface and engaged with the first step to control a deployment area of the second reflection wing.

3. The lamp of claim 2, wherein:

the reflection unit comprises two or more second reflection wings, at least one of the second reflection wings having a second space formed therein, one side open and one shielded side, and another of the second reflection wings being accommodated in the second space.

4. The lamp of claim 3, wherein the another second reflection wing comprises a third step formed in the second space when having the second space formed therein.

5. The lamp of claim 1, wherein the drive unit comprises:

an actuator configured to be controlled by the control unit, and a gear unit configured to rotate the movement member by receiving a rotational force of the actuator.

6. The lamp of claim 5, wherein the movement member comprises a rack gear positioned on one end, configured to be moved in engagement with the gear unit, and configured to perform the linear movement in an extension direction of the movement member.

7. The lamp of claim 6, wherein:

the housing further comprises a cover part configured to surround another end of the movement member, and the cover part comprises one shielded end and an open end, and is coupled to the movement member by surrounding one end of the movement member.

8. The lamp of claim 7, wherein:

the housing further comprises a first accommodation part configured to accommodate one end of the movement member, and a first connection part having one end coupled with the first accommodation part and another end coupled with the cover part, and the first connection part comprises a fourth step formed in the another end while having a predetermined height configured to block movement of the cover part.

9. The lamp of claim 1, wherein:

the drive unit comprises an actuator, a driving worm gear connected to and configured to be driven by the actuator, a first driven gear configured to be driven by being inserted into a shaft connected to the driving worm gear, and a second driven gear configured to be moved in engagement with the first driven gear, and moved in one direction, and the second driven gear comprises a screw thread positioned in a center, and the movement member comprises a screw thread positioned on an outside and corresponding to the center of the second driven gear and configured to be inserted into the center of the second driven gear.

10. The lamp of claim 1, wherein:

the housing further comprises a cover rotation part surrounding the another end of the movement member, and the cover rotation part has one shielded end and an open end, is coupled to the movement member by surrounding one end of the movement member, and comprisesn a screw thread positioned on an outer surface of the another end.

11. The lamp of claim 10, wherein:

the housing further comprises a second accommodation part configured to accommodate one end of the movement member, and a second connection part having one end coupled with the second accommodation part and another end coupled with the cover rotation part, and the second connection part comprises a screw thread positioned on an inner surface of the another end and corresponding to an outer surface of the another end of the cover rotation part.

12. The lamp of claim 1, wherein the movement member has a fifth step protruding from the another end while having a predetermined height.

13. The lamp of claim 1, wherein the reflection unit has a communication hole formed in a center thereof and into which the movement member is configured to be inserted, and is bent at a predetermined curvature to have a concave center.

14. The lamp of claim 1, wherein the control unit is configured to move the movement member to one side by supplying power to an actuator of the drive unit when the requested view range has a predetermined reference value or more.

* * * * *